United States Patent [19]

Kock et al.

[11] Patent Number: 4,727,131

[45] Date of Patent: Feb. 23, 1988

[54] WHOLLY AROMATIC MESOMORPHIC POLYESTER AMIDES AND THE PREPARATION THEREOF

[75] Inventors: Hans-Jakob Kock, Ludwigshafen; Bernd Hisgen, Limburgerhof, both of Fed. Rep. of Germany

[73] Assignee: BASF Aktiengesellschaft, Ludwigshafen, Fed. Rep. of Germany

[21] Appl. No.: 938,062

[22] Filed: Dec. 4, 1986

[30] Foreign Application Priority Data

Dec. 4, 1985 [DE] Fed. Rep. of Germany ....... 3542779

[51] Int. Cl.⁴ ...................... C08G 63/54; C08G 69/44
[52] U.S. Cl. .................... 528/183; 528/171; 528/176; 528/179; 528/184; 528/193; 528/194
[58] Field of Search ............... 528/171, 176, 179, 183, 528/184, 193, 194

[56] References Cited

U.S. PATENT DOCUMENTS

| | | | |
|---|---|---|---|
| 4,118,372 | 10/1978 | Schaefgen | 528/190 |
| 4,330,457 | 5/1982 | East et al. | 524/602 |
| 4,351,917 | 9/1982 | Calundann et al. | 524/602 |
| 4,351,918 | 9/1982 | Charbonneau et al. | 524/602 |
| 4,375,530 | 3/1983 | Hay et al. | 524/605 |
| 4,414,381 | 11/1983 | Griffin et al. | 528/190 |
| 4,499,256 | 2/1985 | Blundell et al. | 528/172 |
| 4,564,669 | 1/1986 | Dicke et al. | 528/173 |
| 4,567,247 | 1/1986 | Yoon | 528/190 |

FOREIGN PATENT DOCUMENTS 0081900 6/1983 European Pat. Off. .
1507207 4/1978 United Kingdom .

*Primary Examiner*—Lucille M. Phynes
*Attorney, Agent, or Firm*—Keil & Weinkauf

[57] ABSTRACT

Wholly aromatic mesomorphic polyester amides which form a liquid-crystalline fiber-forming melt below 320° C. and are composed of (a) from 5 to 35 mol % of repeat units of the formula I

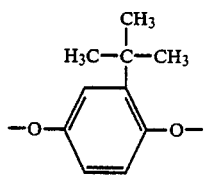

(b) from 5 to 15 mol % of repeat units of the formula II

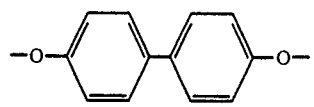

(c) a molar amount corresponding to the total amount of components (a) and (b), and, when (e) signifies repeat units of the formula VI or VII, (e) of repeat units of the formula III

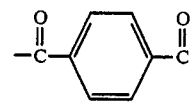

(d) not less than 10 mol % of repeat units of the formula IV

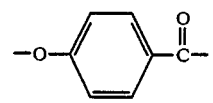

(e) from 2 to 15 mol % of repeat units of the formula V

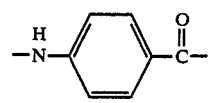

or of the formula VI

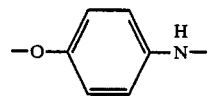

the repeat units of the formula VI being replaceable in part by repeat units of the formula VII

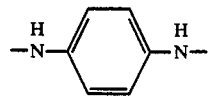

with the proviso that the molar proportions of components (a), (b), (c), (d) and (e) add up to 100 mol % in each case, the preparation thereof and fibers, films, molding and surface coating materials prepared therefrom.

13 Claims, No Drawings

WHOLLY AROMATIC MESOMORPHIC POLYESTER AMIDES AND THE PREPARATION THEREOF

The present invention relates to wholly aromatic mesomorphic polyester amides which form a liquid-crystalline fiber-forming melt below 320° C.

Liquid-crystalline polyester amides are known. However, these polymers are in need of improvement in respect of heat distortion resistance, processability and especially abrasion resistance. U.S. Pat. No. 4,330,457 describes polyester amides based on hydroxynaphthalenecarboxylic acid, terephthalic acid, hydroquinone and p-aminophenol. However, these polyester amides have a glass transition temperature of about 110° C., and consequently a low heat distortion resistance. The same is true of the polyester amides disclosed in U.S. Pat. No. 4,351,917, which are based on p-aminophenol, p-hydroxybenzoic acid and hydroxynaphthalenecarboxylic acid. Finally, EP Application No. 81,900 discloses polyester amides which are at least 40% coaxial units such as aromatic dicarboxylic acids, hydroxyaromatic carboxylic acids, bisphenols and aminophenols and contain a sufficient amount of nonlinear radicals which are derived from aromatic m-amino compounds or binuclear aromatic sulfones. However, no indication is given as to which composition is necessary to obtain the desired combination of properties.

It is an object of the present invention to provide wholly aromatic mesomorphic polyester amides which form a liquid-crystalline fiber-forming melt below 320° C. and thus are easy to process and which, moreover, have a heat distortion resistance, a high abrasion resistance and high resilience.

We have found that this object is achieved with wholly aromatic mesomorphic polyester amides which form a liquid-crystalline fiber-forming melt below 320° C. and are composed of (a) from 5 to 35 mol % of repeat units of the formula I

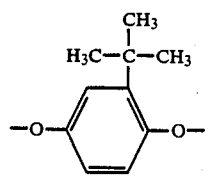

(b) from 5 to 15 mol % of repeat units of the formula II

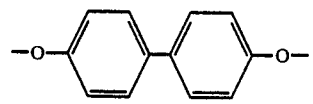

(c) a molar amount corresponding to the total amount of components (a) and (b), and, when (e) signifies repeat units of the formulae VI and VII, (e) of repeat units of the formula III

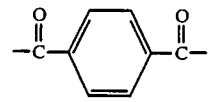

(d) not less than 10 mol % of repeat units of the formula IV

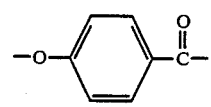

(e) from 2 to 15 mol % of repeat units of the formula V

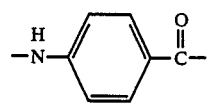

or of the formula VI

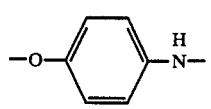

the repeat units of the formula VI being replaceable in part by repeat units of the formula VII

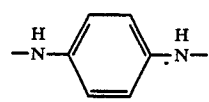

with the proviso that the molar proportions of components (a), (b), (c), (d) and (e) add up to 100 mol % in each case.

The novel polyester amides have the advantage of having a smooth abrasion-resistant surface and a high heat distortion resistance. The novel polyester amides further have good mechanical properties, in particular high resilience. In addition, the novel polyester amides are substantially resistant to chemicals and flameretardant. The novel polyester amides finally have the advantage of forming a liquid-crystalline fiber-forming melt, and of being easily processable, at below 320° C.

The liquid-crystalline state of the polyester amides can be detected with a polarization microscope by a method described in German Published Application DAS No. 2,520,819. Applied in a thickness of 10 μm between glass plates and viewed between crossed polarizers, the polymer melts have textures which can be ascribed to a mesomorphic phase.

The polyester amides according to the invention are composed of (a) from 5 to 35 mol % of repeat units of the formula I. A suitable starting compound is, for example, tertbutylhydroquinone.

(b) From 5 to 15 mol % of repeat units of the formula II. An advantageous starting compound is, for example, 4,4'-dihydroxybiphenyl.

(c) A molar amount corresponding to the total amount of components (a), (b) and, when (e) signifies repeat units of the formulae VI and VII, (e) of repeat units of the formula III. A suitable starting compound is, for example, terephthalic acid.

(d) Not less than 10 mol %, in particular not less than 20 mol %, of repeat units of the formula IV. An advantageous starting compound is p-hydroxybenzoic acid.

(e) From 2 to 25 mol % of repeat units of the formula V or VI. An advantageous starting compound for units of the formula V is p-aminobenzoic acid and for units of the formula VI 4-aminophenol. It is also possible to replace some of the units of formula VI by those of the formula VII, the amount being advantageously from 2 to 5 mol %. A suitable starting compound for units of the formula VII is, for example, p-phenylenediamine.

It will be readily understood that the molar proportions of components (a), (b), (c), (d) and (e) add up to 100 mol % in each case.

In suitable wholly aromatic mesomorphic polyester amides, some of component (b) is replaced by units of the formula VIII or IX

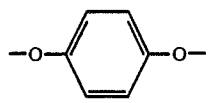

VIII

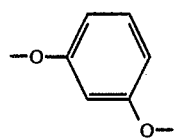

IX

An advantageous starting compound for units of the formula VIII is hydroquinone and for those of the formula IX resorcinol. Preferably units of the formula VIII and/or IX are present in an amount of from 3 to 12 mol %.

It is also possible to replace some of component (a) by repeat units of the formula X

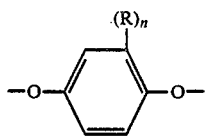

X where R is halogen, $C_1$-$C_4$-alkyl (except t-butyl) or phenyl and n is 1, 2 or 3. Advantageously, units of the formula X are present in an amount of from 5 to 15 mol %. Suitable starting compounds for units of the formula X are, for example, chlorohydroquinone, methylhydroquinone, trimethylhydroquinone and phenylhydroquinone.

The repeat units of the formula X are advantageously present in the polyester amides according to the invention in an amount of from 5 to 15 mol %.

Preferred wholly aromatic polyester amides have a glass transition temperature Tg of $\geqq 150°$ C., in particular of $\geqq 170°$ C. This glass transition temperature is measured by the DSC method described by K. H. Illers in Makromol. Chem. 127 (1969), 1. The wholly aromatic liquid-crystalline polyester amides form a liquid-crystalline fiber-forming melt at $<320°$ C., in particular $<300°$ C. Preference is also given to liquid-crystalline aromatic polyester amides which have partial crystallinity at $>200°$ C. and $<300°$ C.

The liquid-crystalline polyester amides according to the invention are obtainable in a manner similar to that described, for example, in U.S. Pat. Nos. 4,375,530 and 4,118,372.

In an advantageous embodiment, the polyester amides according to the invention are obtained in a single-stage process by converting the underivatized starting materials using anhydrides of lower fatty acids, for example fatty acids of 2 to 4 carbon atoms, in particular acetic anhydride, with or without catalysts. Suitable catalysts are described, for example, in EP-A-131,846 (page 9). They are advantageously used in an amount of from 0.001 to 1% by weight, based on the starting materials. In the conversion, the starting materials are heated together with the fatty acid anhydride, which is advantageously present in a molar excess of not less than 5%, based on the amino and hydroxyl groups present, with stirring in an inert gas atmosphere to a temperature at which reflux occurs. Advantageously the temperature is raised in stages, for example to 130°-200° C. in not more than 5 hours, preferably up to 2 hours, and is subsequently raised to 250°-350° C., for example in the course of 2-2½ hours, while excess fatty acid anhydride and fatty acid are distilled off. To complete the reaction, it has been found to be advantageous to employ reduced pressure, for example 200 to 0.1 mbar, toward the end.

It is a remarkable and unforeseeable feature of this single-stage process that the desired polymer is obtained in a relatively short time in a troublefree and complete reaction without catalysts. This is all the more astonishing as the large number of chemically different amino and hydroxyl groups would be expected to lead to differences in reactivity and hence to inadequate polymer synthesis.

The wholly aromatic liquid-crystalline polyester amides thus obtained are advantageously further condensed in the solid state, for example at 150°-250° C., until the desired viscosity is obtained. This postcondensation in solid phase can take place not only before but also after thermoplastic processing. Advantageously the solid phase condensation is carried out in the presence of inert gases such as nitrogen.

The polyester amides according to the invention can be modified by means of conventional additives such as stabilizers, oxidation inhibitors, agents against thermal decomposition and decomposition by ultraviolet light, lubricants, mold release agents, colorants such as dyes and pigments, fibrous or pulverulent fillers and reinforcing agents, nucleating agents or plasticizers. Such agents are employed in conventional active amounts.

The stabilizers can be added to the polyester amides at any stage of the preparation or when completed. Preferably the stabilizers are added early on to prevent the onset of decomposition before the polymers are protected.

The oxidation inhibitors and heat stabilizers which can be added to the polyester amides according to the invention include those which are generally employed for polymers, such as halides of metals of group I of the periodic table, for example halides of sodium, potassium or lithium together with copper(I) halides, for example chlorides, bromides or iodides. Other suitable stabilizers are sterically hindered phenols, hydroquinones and different substituted representatives of these groups and combinations thereof. These stabilizers are generally employed in concentrations of up to 1% by weight, based on the weight of the mixture.

Suitable UV stabilizers also include those which are generally added to polymers, for example in amounts of up to 2% by weight, based on the polymeric material. Examples of UV stabilizers are different substituted resorcinols, salicylates, benzotriazoles, benzophenones and the like.

Further suitable assistants are organic dyes such as nigrosine, and pigments such as titanium dioxide, cadmium sulfide, cadmium sulfide selenide, phthalocyanines, ultramarine blue or carbon black. Examples of suitable fibrous and pulverulent fillers and reinforcing agents are carbon fibers, glass fibers, amorphous silica, asbestos, calcium silicate, aluminum silicate, magnesium carbonate, kaolin, chalk, quartz powder, mica or feldspar. These reinforcing agents are advantageously used in amounts of up to 70% by weight of the polymer.

Other possible assistants are nucleating agents, such as talcum, calcium fluoride, sodium phenyl phosphinate, aluminum oxide and finely divided polytetrafluoroethylene.

Suitable plasticizers which can be employed in amounts of up to, for example, 20% by weight of the polymer are dioctyl phthalate, dibenzyl phthalate, butyl benzyl phthalate, hydrocarbon oils, N-n-butylbenzenesulfonamide, and o- and p-tolueneethylsulfonamide. Colorants such as dyes or pigments can be employed in amounts of up to 5% by weight.

The wholly aromatic liquid-crystalline polyester amides according to the invention are suitable for preparing filaments, fibers, films, foams and industrial moldings by injection molding, pressing or extruding. The moldings prepared from the polyester amides according to the invention have excellent mechanical properties such as stiffness, strength and resilience. They are remarkably resistant to chemicals and flame-retardant. They also have a high heat distortion resistance and a smooth abrasion-resistant surface. The polyester amides according to the invention are therefore highly suitable for preparing moldings for electrical engineering, data processing, automotive construction and other industrial sectors. But they can also be used as surface coating materials, in pulverulent dispersion or as film.

The invention is illustrated by the following Examples.

EXAMPLE 1

0.2 mol of terephthalic acid, 0.26 mol of 4-hydroxybenzoic acid, 0.06 mol of 4-aminobenzoic acid, 0.16 mol of tert-butylhydroquione, 0.04 mol of 4,4'-dihydroxydiphenyl and 0.86 mol of acetic anhydride are weighed into a flask equipped with a stirrer, nitrogen inlet and distillation attachment. Under nitrogen the contents are heated in a metal bath to 100° C. The temperature is then raised to 150° C. in 30', to 200° C. in a further 100' and finally to 340° C. in 120'. The pressure is then reduced to 560 mbar and subsequently halved every 10'. The final vacuum is 50 mbar. In this way a very viscous fiber-forming melt is obtained. DSC measurements indicate a glass transition temperature of 182° C. The intrinsic viscosity is 2.2 dl/g, measured at 60° C. in an 0.1% strength by weight solution in pentafluorophenol.

EXAMPLE 2

0.2 mol of terephthalic acid, 0.23 mol of 4-hydroxybenzoic acid, 0.03 mol of 4-aminobenzoic acid, 0.16 mol of tert-butylhydroquinone, 0.04 mol of 4,4'-dihydroxybiphenyl and 0.86 mol of acetic anhydride are polycondensed as in Example 1. The final vacuum is 100 mbar. The liquid-crystalline polyester amide has a glass transition temperature of 185° C. and an intrinsic viscosity of 1.75 dl/g.

EXAMPLE 3

0.2 mol of terephthalic acid, 0.26 mol of 4-hydroxybenzoic acid, 0.02 mol of 4-aminophenol, 0.04 mol of 4,4'-dihydroxydiphenyl, 0.14 mol of tert-butylhydroquinone and 0.86 mol of acetic anhydride are reacted as in Example 1. The temperature is raised to 150° C. in 30', to 200° C. in a further 100' and to 340° C. in 120'. The final vacuum is 90 mbar. The liquid-crystalline polyester amide has a glass transition temperature of 175° C. and an intrinsic viscosity of 1.0 dl/g.

We claim:

1. A wholly aromatic mesomorphic polyester amide which forms a liquid-crystalline fiber-forming melt below 320° C. and is composed of
   (a) from 5 to 35 mol % of repeat units of the formula I

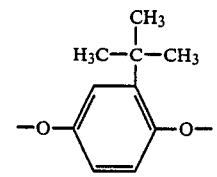

(b) from 5 to 15 mol % of repeat units of the formula II

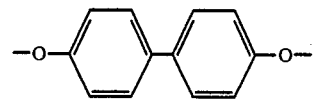

(c) a molar amount corresponding to the total amount of components (a) and (b), and, when (e) signifies repeat units of the formula VI or VII, (e) of repeat units of the formula III

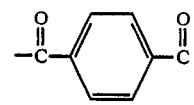

(d) not less than 10 mol % of repeat units of the formula IV

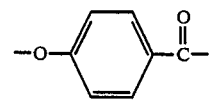

(e) from 2 to 15 mol % of repeat units of the formula V

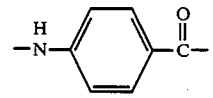

or of the formula VI

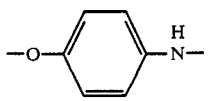

VI the repeat units of the formula VI being replaceable in part by repeat units of the formula VII

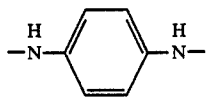

VII with the proviso that the molar proportions of components (a), (b), (c), (d) and (e) add up to 100 mol % in each case.

2. A wholly aromatic mesomorphic polyester amide as claimed in claim 1, wherein some of the units of the formula I are replaced by repeat units of the formulae VIII and/or IX

VIII

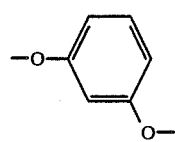

IX

3. A wholly aromatic mesomorphic polyester amide as claimed in claim 1, which contains from 3 to 12 mol % of repeat units of the formula VIII or IX.

4. A wholly aromatic mesomorphic polyester amide as claimed in claim 1, wherein some of the units of the formula I are replaced by repeat units of the formula X

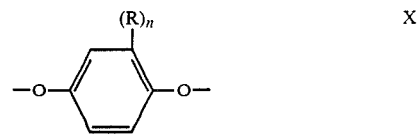

X where R is halogen, alkyl of up to 4 carbon atoms (except t-butyl) or phenyl, and n is 1, 2 or 3.

5. A wholly aromatic mesomorphic polyester amide as claimed in claim 1, which contains from 5 to 15 mol % of repeat units of the formula X.

6. A wholly aromatic mesomorphic polyester amide as claimed in claim 1, which has a glass transition temperature $>150°$ C.

7. A process for preparing a wholly aromatic mesomorphic polyester amide as claimed in claim 1 by reacting the monomers in the form of the underivatized hydroxy, amino and carboxy compounds in a single-stage process and in the molar ratios described in the presence of excess fatty acid anhydride at elevated temperatures and distilling fatty acid anhydride and fatty acid out of the reaction mixture.

8. A process as claimed in claim 7, wherein the wholly aromatic polyester amide, after the condensation in the melt, is postcondensed in the solid phase at $150°-250°$ C.

9. A filament prepared from a wholly aromatic polyester amide as claimed in claim 1.

10. A fiber prepared from a wholly aromatic polyester amide as claimed in claim 1.

11. A molding prepared from a wholly aromatic polyester amide as claimed in claim 1.

12. A film prepared from a wholly aromatic polyester amide as claimed in claim 1.

13. A surface coating material prepared from a wholly aromatic polyester amide as claimed in claim 1.

* * * * *